United States Patent [19]

Kubo et al.

[11] Patent Number: 4,786,892

[45] Date of Patent: Nov. 22, 1988

[54] X-Y DIRECTION INPUT DEVICE HAVING CHANGEABLE ORIENTATION OF INPUT AXES AND SWITCH ACTIVATION

[75] Inventors: Yoshizo Kubo, Furukawa; Masanori Harada, Kawasaki; Daisuke Gotoh, Minamikata, all of Japan

[73] Assignee: Alps Electric Co., Ltd., Japan

[21] Appl. No.: 728

[22] Filed: Jan. 6, 1987

[30] Foreign Application Priority Data

| | | | |
|---|---|---|---|
| Feb. 22, 1986 | [JP] | Japan | 61-23865[U] |
| Feb. 22, 1986 | [JP] | Japan | 61-23866[U] |
| Feb. 22, 1986 | [JP] | Japan | 61-23867[U] |
| Feb. 22, 1986 | [JP] | Japan | 61-23868[U] |

[51] Int. Cl.⁴ .......... G09G 1/00; G05G 9/00

[52] U.S. Cl. .......... 340/365 R; 340/710; 74/471 XY; 178/18

[58] Field of Search .......... 340/710, 365 UL, 709, 340/365 R, 712; 74/471 XY; 178/18–20

[56] References Cited

U.S. PATENT DOCUMENTS

| | | | |
|---|---|---|---|
| 3,643,148 | 2/1972 | Brown et al. | 340/710 |
| 3,835,464 | 9/1974 | Rider | 340/710 |
| 4,032,931 | 6/1977 | Haker | 340/365 UL |
| 4,562,347 | 12/1985 | Hovey et al. | 340/710 |

*Primary Examiner*—Marshall M. Curtis

*Attorney, Agent, or Firm*—Guy W. Shoup; Paul J. Winters

[57] ABSTRACT

An X-Y direction input device includes a ball, a switchboard carrying push switches, first and second follower rollers rotated by the ball having axes perpendicular to each other, and rotation detecting means which all are enveloped by an outer shell. The push switches are activated by switch activating members exposed on the outer surface of the outer shell. The axes of the first and second follower rollers may be rotated by a desired angle with respect to an orientation of the outer shell.

4 Claims, 12 Drawing Sheets

X-Y DIRECTION INPUT DEVICE HAVING CHANGEABLE ORIENTATION OF INPUT AXES AND SWITCH ACTIVATION

FIELD OF THE INVENTION

This invention relates to an X-Y direction input device the most suitable application of which is expected in a graphic display apparatus.

BACKGROUND OF THE INVENTION

A graphic display apparatus basically comprises a display screen, display controller, data channels and some input devices.

There are many types of input devices one of which is an X-Y direction input device called "MOUSE" (tradename) configured to detect the moving direction and distance of a casing on a base.

The X-Y direction input device basically comprises a rotatably supported ball made of steel, for example, a first follower roller contacting and rotated by the ball, a second follower roller contacting and rotated by the ball and having an axis perpendicular to the axis of the first follower roller, first and second rotation detectors each including rotary electrical members such as variable resistor and encoder to separately detect rotations of the first and second follower rollers, and a casing which receives and envelopes the ball, first and second follower rollers, first and second rotation detectors and other related members.

Normally, such an X-Y direction input device further comprises push switches located inside the casing to effect deletion or dislocation of patterns displayed on the screen or to effect various signal processing for other switching and control operations when activated through switch operating members exposed outside the casing for manual compression.

The casing has an aperture which opens at the bottom thereof to allow the ball to slightly project downward. When the casing is moved, rotating the ball on the base, the first and second follower rollers are rotated in predetermined different (X- and Y-) directions respectively. The directions and amounts of rotations of the first and second follower rollers are extracted by the first and second rotation detectors separately, as corresponding voltages or digital signals of X- and Y-directional components, and the signals are entered in the display apparatus.

In the prior art X-Y direction input device, the reference axes of the coordinate system are fixed by positions of the first and second follower rollers with respect to the casing. For example, if the first follower roller for detection of an X-direction component is disposed parallel to the length direction of the casing whereas the second follower roller for detection of a Y-direction component is disposed perpendicular to the second follower roller, the coordinate system of the input device is absolutely fixed, with the shorter margin (width) of the casing being the X-axis and the longer margin (length) of the casing being the Y-axis. Therefore, a user has to grip or pinch the input device so that the length direction thereof extends accurately longitudinally with respect to his body, when he moves it to effect a desired input operation.

However, the best holding angle of the input device varies with users. For example, it will be more convenient for some users to incline the input device by an angle with respect to his body. It will often occur for these users that although he intended to move the input device longitudinally, i.e. in the Y-axis direction, in the attempt to move the cursor in the Y-axis direction on the screen, the cursor actually moved in an inclined direction. This is because the actual moving direction of the user's hand does not coincide with the length direction of the casing, i.e. the Y-axis direction of the input device.

This also applies to an X-Y direction input device called "TRACKBALL" type where a casing is put on a desk or other base member, with a ball being exposed above the casing for manual rotating operation. The "TRACKBALL" type input device will similarly cause a deviation between the coordinate axes in the user's mind and the coordinate axes of the input device if the user puts the input device on the desk, with its coordinate axes being deviated from user's intended coordinate axes.

Additionally, as to switch activating members provided on the casing for manual compression to instruct a desired signal processing, their best positions vary with users.

OBJECT OF THE INVENTION

It is therefore an object of the invention to provide an X-Y direction input device wherein the orientation of the coordinate axes thereof readily changed by users with respect to its outer shell, to facilitate any user to properly move the input device in a desired direction regardless of his gripping angle on the casing of the input device.

A further object of the invention to provide an X-Y direction input device which is readily assembled.

A still further object of the invention to provide an X-Y direction input device which facilitates any user to readiy compress switch activating members for a desired signal processing regardless of his gripping angle on the casing of the input device.

SUMMARY OF THE INVENTION

According to the most generic form of the invention, there is provided an X-Y direction input device comprising:

a rotatably mounted ball;

a first follower roller contacting and rotated by said ball;

a second follower roller contacting and rotated by said ball and having an axis perpendicular to the axis of said first follower roller;

a first rotation detecting means detecting the rotation of said first follower roller;

a second rotation detecting means detecting the rotation of said second follower roller;

a switchboard carrying a push switch assembly for processing signals from said first and second rotation detecting means;

a switch activating means for activating said push switch assembly; and an inner shell means enveloping at least said ball, first and second follower rollers and first and second rotation detecting means, and an outer shell means enveloping at least said switch board and having an external orientation axis in said X-Y plane, said switch activating means being exposed on outer surfaces of said outer shell means, and said inner shell means being rotatably engaged with said outer shell means for rotation relative thereto in said X-Y plane, whereby said first and second axes of said first and second follower rollers can be rotatively changed when desired relative to said external orientation axis of said outer shell means.

This arrangement permits a user to change the angles of the first and second follower rollers with respect to the casing in a plane involving their axes so that the user's intended coordinate axes coincide with the coordinate axes of the input device made by the axes of the first and second follower rollers.

In a more preferred form of the invention, said outer and inner shell means may consist of outer and inner casings relatively rotatable by an angle limited by stoppers formed on the casings. The first casing supports at least said switch board and switch activating members, and the second casing supports at least said ball, first and second follower rollers and first and second rotation detecting means.

With this arrangement, the orientation of the coordinate axes made by the axes of the first and second follower rollers may be readily changed with respect to the orientation of the outer casing by simply rotating the inner casing. Further, the relative rotation of the casings never applies any destructive force to lead wires which connect the rotation detecting means to the switch board, because the maximum relative rotation is limited within an angle by the stoppers.

In a further preferred form of the invention, the casing has a double switch activating arrangement including first switch activating members on the upper surface thereof and second switch activating members on the side walls thereof, so that any user can select his more convenient compressing action on the upper surface or on to the side walls to instruct a desired signal processing.

DETAILED DESCRIPTION

Figure 1:
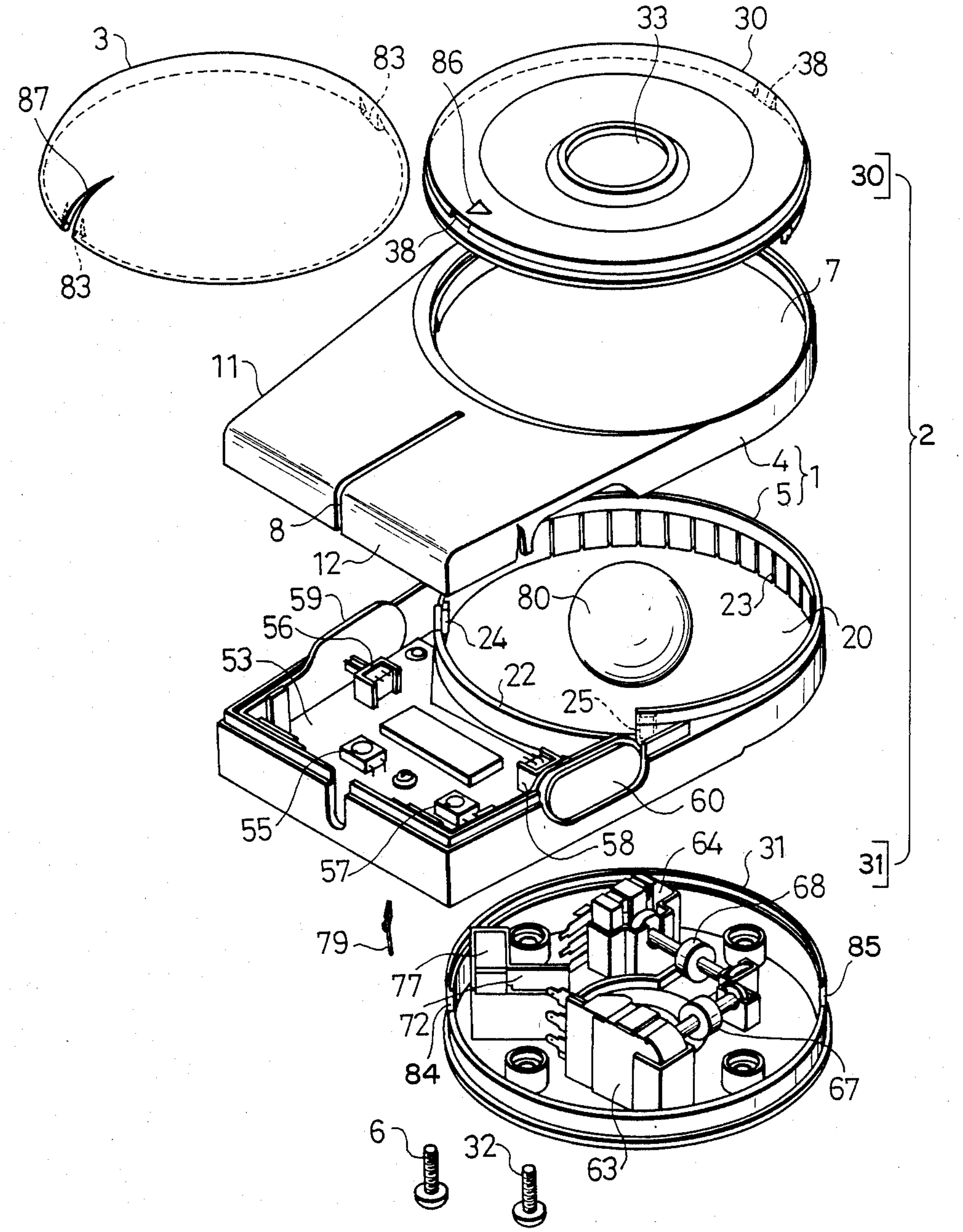

The invention is hereinbelow described in detail, referring to a preferred embodiment illustrated in the drawings.

FIG. 1 is an exploded perspective view of an input device embodying the invention, and FIGS. 2 through 24 are fragmentary views of the input device for better or more detailed explanation thereof. The input device generally comprises outer casing 1 defining the outer margin, inner casing 2 (shown at 30 and 31 in FIG. 1) rotatably held in the outer casing, rotation detector means mounted in the inner casing 2, and a cover 3 removably mounted on the inner casing 2.

The outer casing 1 includes upper and lower cases 4 and 5 both made from ABS or other synthetic resin and united together by two screws 6 (only one is illustrated in FIG. 1) applied from the bottom of the lower case 5.

Figure 2:
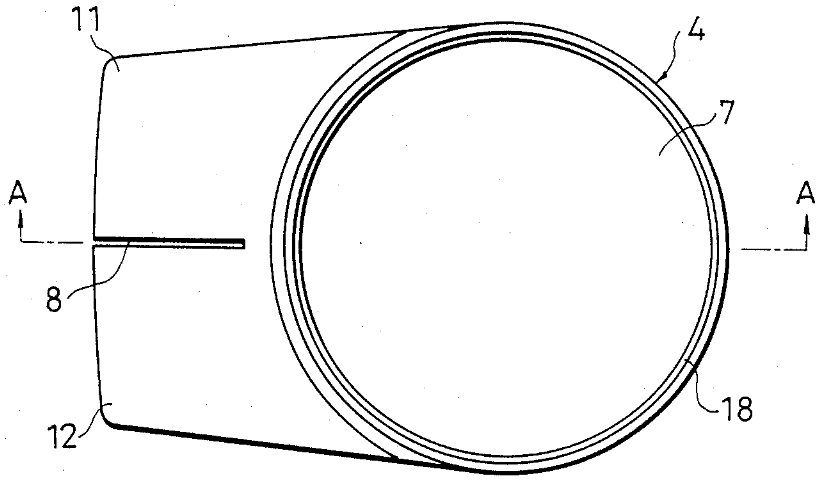
Figure 3:
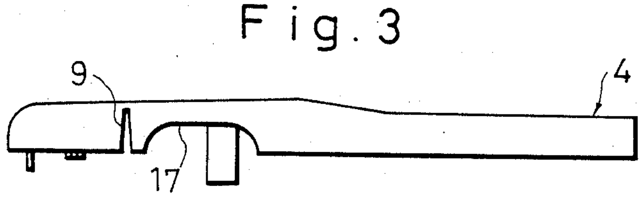
Figure 4:
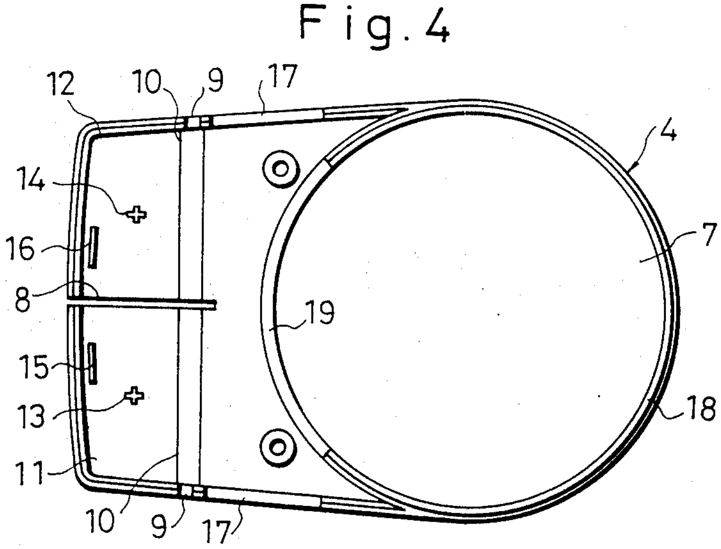
Figure 5:
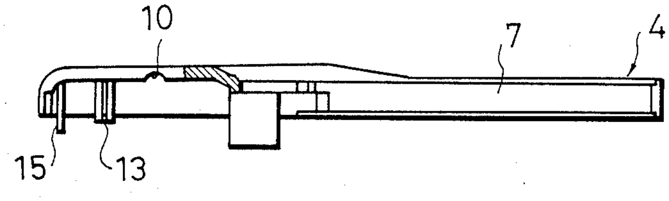

FIGS. 2 through 5 are various views of the upper case 4 in which FIG. 2 is a plan view, FIG. 3 is a side elevation, FIG. 4 is a bottom view, and FIG. 5 is a cross-sectional view taken along A—A line of FIG. 2. In these drawings, the upper case 4 has a large diameter aperture 7 at its right half, a slit 8 formed in the upper wall of its left half and extending toward the aperture 7 and wedge-shaped slits 9 formed in its opposite side walls. The upper wall of the upper case 4 has a thin wall portion 10 made by offsetting a portion of the lower surface thereof between the slits 8 and 9, so that two portions defined by the slits 8–9 and thin wall portion 10 are used as operating levers 11 and 12 which are hinged to the upper case 4 by the thin wall portion 10.

The operating levers 11 and 12 have push pins 13 and 14 each extending vertically from a central portion of the lower surface thereof to compress push switches which will be described later. Near the push pins 13 and 14, restrictive walls 15 and 16 extend vertically from the lower surface of the operating levers 11 and 12 to limit downward movement of the operating levers. The side walls of the upper case 4 have curved cutouts 17. A circumferential wall 18 defining the aperture 7 has a vertically offset portion 19 over 90 degrees approximately.

Figure 6:
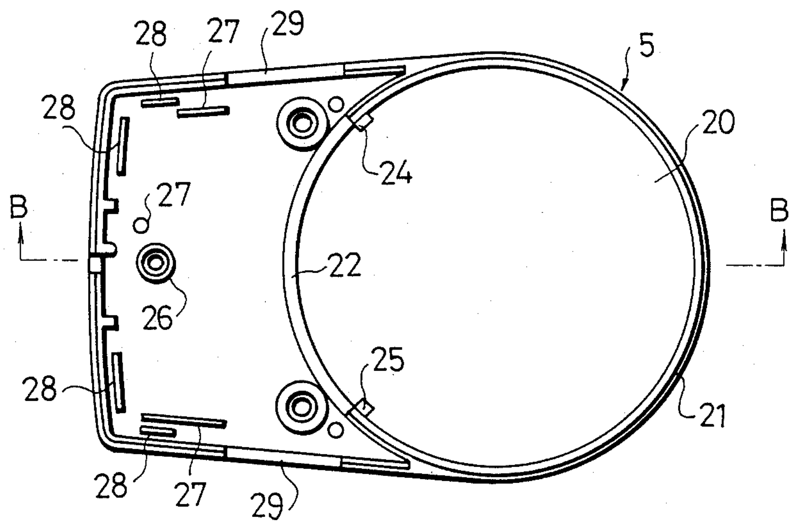
Figure 7:
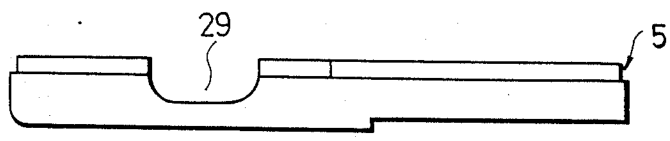
Figure 8:
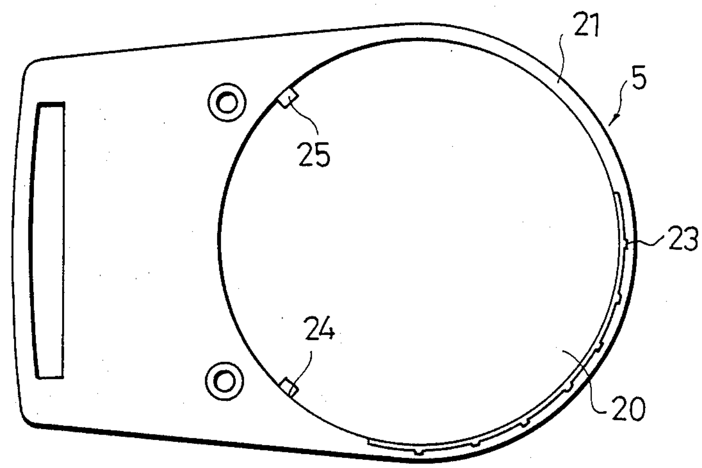
Figure 9:
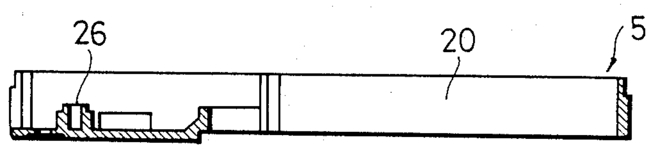

FIGS. 6 through 9 illustrate the lower case 5 in which FIG. 6 is a plan view, FIG. 7 is a side elevation, FIG. 8 is a bottom view, and FIG. 9 is a cross-sectional view taken along B—B line of FIG. 6. In these drawings, the lower case 5 has an aperture 20 equal in diameter to the aperture 7 of the upper case 4. A circumferential wall 21 defining the aperture 20 has a vertically offset portion 22 over 90 degrees approximately, a plurality of click notches 23 at a given interval, and first and second stoppers 24 and 25 at both ends of the offset portion 22. A bottom wall at the left end of the lower case 5 has a boss 26 and a plurality of ribs 27 to fixingly support a circuit board (described later) at a predetermined level with respect to the lower case 5. The bottom wall of the lower case 5 has a plurality of holding ribs 28 spaced by a distance from the side and end walls thereof. Opposed side walls of the lower case 5 have curved cutouts 29 corresponding to the cutouts 17 of the upper case 4.

The inner casing 2 consists of an upper rotary member 30 and a lower rotary member 31 both made from ABS or other synthetic resin. Both rotary members are united together by four screws 32 (only one is illustrated in FIG. 1) applied from the lower surface of the lower rotary member 31.

Figure 10:
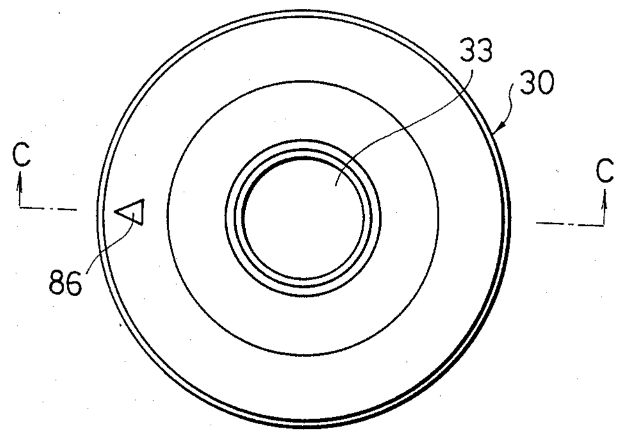
Figure 11:
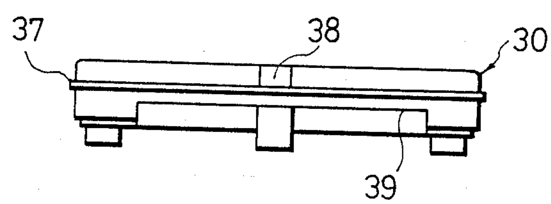
Figure 12:
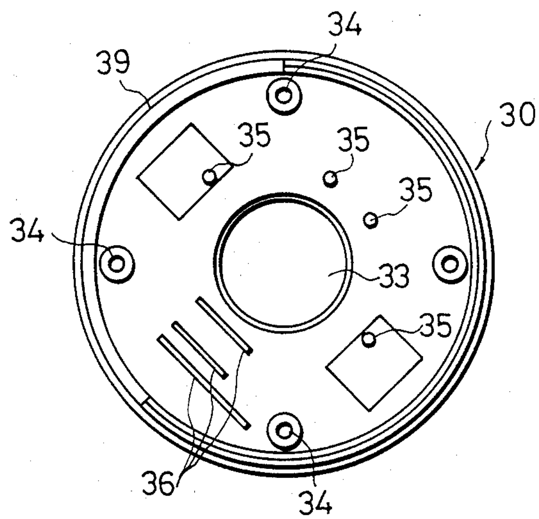
Figure 13:
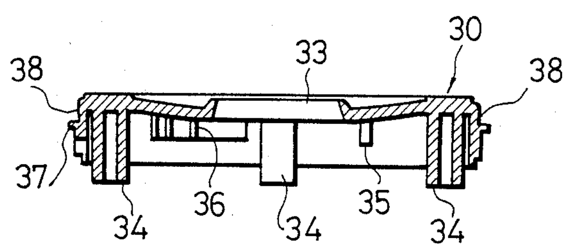

FIGS. 10 through 13 illustrate the upper rotary member 30 in which FIG. 10 is a plan view, FIG. 11 is a side elevation, FIG. 12 is a bottom view, and FIG. 13 is a cross-sectional view taken along C—C line of FIG. 10. In these drawings, the upper rotary member 30 has an aperture 33 formed in a central portion thereof and slightly smaller in diameter than a ball which will be described later. The upper rotary member 30 further includes four screw bosses 34, four support pins 35 and some support walls 36 all extending vertically from the lower surface thereof. The outer diameter of the circumferential wall of the upper rotary member 30 is substantially equal to the diameter of the apertures 7 and 20 of both cases 4 and 5. The circumferential wall of the upper rotary member 30 has a flange 37 extending radially from the peripheral surface beyond the diameter of the apertures 7 and 20, and a pair of recesses 38 formed above the flange 37 and opposed to each other at 180 degrees distance. The circumferential wall of the upper rotary member 30 further includes a vertically offset portion 39 over 120 degrees approximately.

Figure 14:
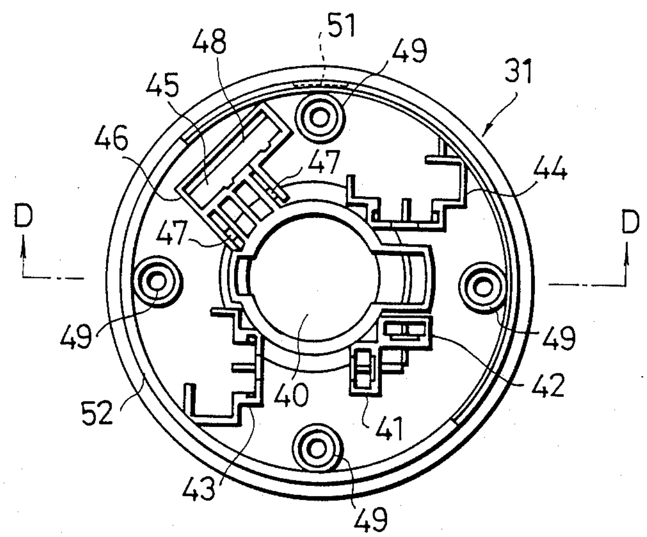
Figure 15:
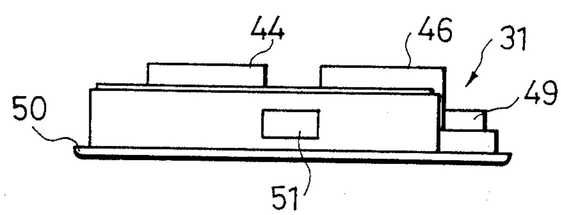
Figure 16:
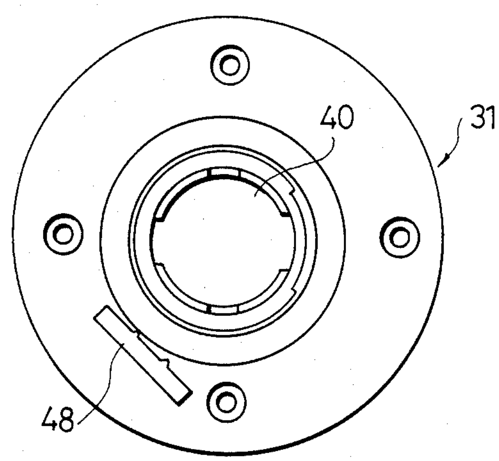
Figure 17:
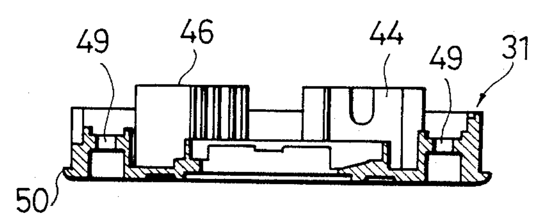

FIGS. 14 through 17 the lower rotary member 31 in which FIG. 14 is a plan view, FIG. 15 is a side elevation, FIG. 16 is a bottom view, and FIG. 17 is a cross-sectional view taken along D—D line of FIG. 14. Referring to these drawings, the lower rotary member 31 has an aperture 40 formed at a central portion thereof and slightly larger in diameter than a ball described later. Around the aperture 40 are provided two bearing chambers 41–42 and two holder chambers 43–44 slightly larger than the bearing chambers 41–42. These chambers accept follower rollers and rotation detectors which will be described later. One bearing chamber 41 and one holder chamber 43 form one associated arrangement and the other bearing chamber 42 and holder chamber 44 form the other associated arrangement. These two arrangements are located so that their center lines make a right angle. Additionally, a housing 46 defining a chamber 45 is provided around the aperture 40 to accept therein a frictional force applying means which will be described later. The housing 46 has a pair of stoppers 47 formed on both side walls thereof and a rectangular window 48 opening at the bottom of the lower rotary member 31.

The lower rotary member 31 has four vertically extending screw bosses 49 corresponding to the bosses 34 of the upper rotary member 30. The outer diameter of the circumferential wall of the lower rotary member 31 is substantially equal to the diameter of the circumferential wall of the upper rotary member 30. The circumferential wall of the lower rotary member 31 has a flange 50 extending from the bottom margin thereof radially outwardly beyond the diameter of the apertures 7 and 20, a recess 51 for accepting a click spring (described later) and a pair of cutouts 52 at 180 degrees distance.

The first and second cases 1 and 2 are assembled into an input device containing various components of the rotation detecting means therein, as explained hereinbelow referring to FIGS. 18 through 20.

Figure 18:
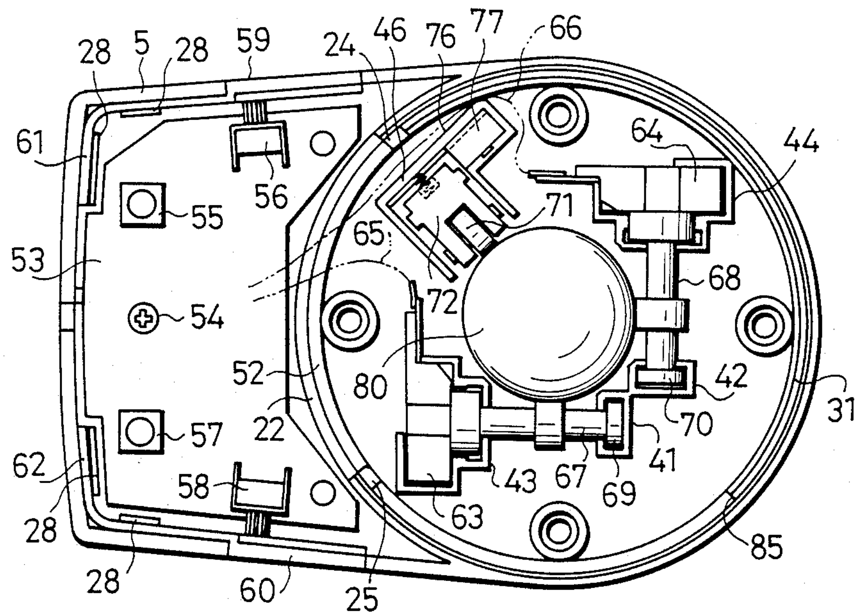
Figure 19:
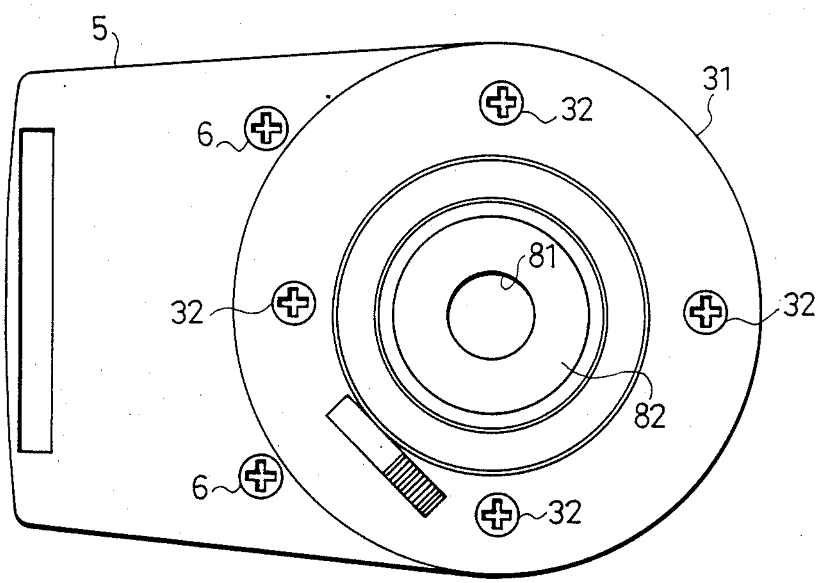
Figure 20:
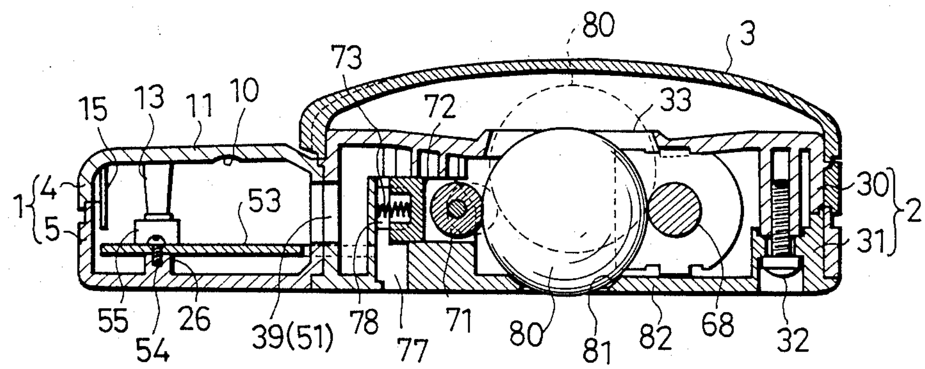
Figure 23:
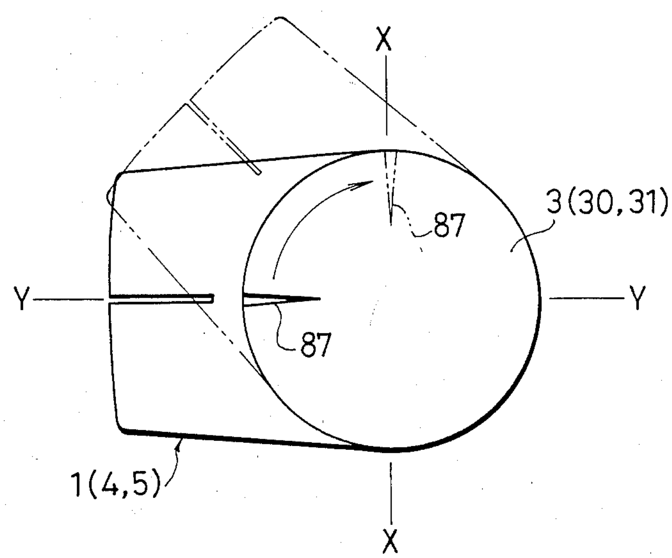

FIG. 18 is a plan view of the input device where the upper case 4, upper rotary member 30 and a cover (described later) are removed, FIG. 19 is a bottom view of the input device, and FIG. 20 is a cross-sectional view of the input device.

As shown in these drawings, a circuit board 53 made from phenolic resin or other relatively hard insulative material is put on the boss 26 and ribs 27 of the lower case 5, and fixed to the lower case 5 by applying a screw 54 downwardly in the boss 26. The circuit board 53 has four push switches 55-56-57-58, interface circuit elements (not shown) and other members soldered thereon. The push switches 55 and 57 are disposed with their operating portions facing upward, whereas the push switches 56 and 58 are disposed with their operating portions facing laterally. These push switches 55 through 58 include a power switch of the input device itself and a signal processing switch to delete a pattern indicated by a cursor on a display apparatus (not shown), to dislocate the cursor on the display apparatus, or to effect other various switching and control operations. The push switches 55 and 56 are connected to effect a uniform signal processing, and the push switches 57 and 58 are connected to effect another uniform signal processing.

As described, the upper and lower cases 4 and 5 are fixingly united together by screws 6 (FIG. 1) after various members are assembled between them. In this condition, the push pins 13 and 14 vertically extending from the operating levers 11 and 12 of the upper case 4 contact the upwardly facing operating portions of the push switches 55 and 57. Between the side and end walls of the lower case 5 and the holding ribs 28 are inserted L-shaped resilient leg members 61 and 62 integrally formed with a pair of switch arms 59 and 60 which contact the laterally facing operating portions of the push switches 56 and 58 and are partly exposed to openings defined by the cutouts 17 and 29 of both cases 4 and 5. The input device is connected to the display apparatus (not shown) by a cord (not shown).

The holder chambers 43 and 44 on the lower rotary member 31 receive therein first and second encoders 63 and 64 which form a rotation detecting means. The encoders 63 and 64 are connected to the circuit board 53 by lead wires 65 and 66 (or flexible plates having desired wiring patterns). Each encoder is of a known type which includes a code plate provided with a desired pattern, a slider rotatably sliding on the code plate and a slider support member supporting the slider (all not shown), and a holder defining the outer margin of the encoder is immovably received in the holder chamber 43 or 44. The slider support members of the first and second encoders 63 and 64 are secured to respective ends of first and second follower rollers 67 and 68 which terminate at the other ends received in position in the bearing chambers 41 and 42 via bearings 69 and 70.

The housing 46 of the lower rotary member 31 accepts various parts of a friction applying means which consists of a roller 71, a roller support member 72 rotatably supporting the roller 71 and a coil spring 73 biasing the roller support member 72 toward a ball (described later). The roller support member 72 has side walls provided with integrally formed projections 74 for engagement with the stoppers 47 of the housing 46. The roller support member 72 is inserted in the chamber 45 of the housing 46 together with the roller 71, with a spring support recess 75 at the rear end thereof engaging one end of a coil spring 73, so that the resiliency of the coil spring 73 causes the roller 71 to slightly project beyond a margin of the housing 46, and causes the projections 74 of the roller support member 72 to engage the stopper 47 of the housing 46. Therefore, the roller support member 72 and roller 71 are prevented from dropping out of the housing 46.

The housing 46 has a planar L-shaped member including an extension 76 at the rear end thereof which may accept a lock member 77. The lock member 77 has a recess 78 which can uncontactingly receive therein the coil spring 73 and is disposed with its lower surface partly exposed through the window 48 of the lower rotary member 31 so that a user can slidably move it along the window 48. When the lock member 77 is positioned in the extension 76 as shown in FIG. 18, the roller support member 72 is slidable in the chamber 45 with the resiliency of the coil spring 73. However, when the lock member 77 is moved to a position to engage the rear end of the roller support member 72, the lock member 77 prevents a withdrawal movement of the roller support member 72.

The first process of assembling the input device is to prepare the lower case 5 (carrying the circuit board 53 and switch arms 59–60) and the lower rotary member 31 (carrying the rotation detecting means such as encoders and follower rollers) respectively. Subsequently, the lower rotary member 31 is inserted in the lower case 5 upwardly until the flange 50 engages the aperture 20. FIG. 18 illustrates the configuration in this step. In this configuration, the first and second encoders 63–64 and the circuit board 53 are electrically connected by lead wires 65–66 (or a flexible plate).

In the next step, the upper case 5 is put on the lower case 5, and the screws 6 are applied from the bottom of the lower case 5 to fixingly unite the cases 4–5. As a result, the push pins 13–14 of the operating levers 11–12 integrally formed with the upper case 4 are located on the push switches 55–57, and the switch arms 59–60 in the lower case 5 are held in the openings defined by the cutouts 7–29 of the cases 4–5 so that they never disengage from the device.

After this, the upper rotary member 30 is inserted downwardly in the aperture 7 of the upper case 4 until the flange 37 engages the upper edge of the aperture 7, and the screws 32 are applied from the bottom of the lower rotary member 31 into aligned screw bosses 34–49 to fixingly unite the rotary members 30–31. As a result, the support pins 35 vertically extending from the upper rotary member 30 engage upper surfaces of the holders of the first and second encoders 63–64 and upper surfaces of the bearings 69–70. The support walls 36 vertically extending from the upper rotary member 30 are slightly spaced and opposed to upper surfaces of the roller support member 72 and lock member 77, so that they never disengage from the chambers 41–44 and housing 46 of the rotation detecting means and friction applying means.

After the rotary members 30 and 31 are mounted in the apertures 7–20 of the cases 4–5, a ball 80 which may be a steel ball coated with a synthetic resin is inserted through the aperture 41 of the lower rotary member 31 and is held therein by an annular cover member 82 having an aperture 81 smaller in diameter than the ball 80 and fixed to the circumferential wall of the aperture 40 of the lower rotary member 31. Finally, the cover 3 made from ABS or other synthetic resin may be mounted on the upper rotary member 30 by resiliently engaging a pair of engage projections 83 of the cover with the recesses 38 of the upper rotary member 30 (FIG. 20).

The assembled input device operates as described hereinbelow.

Figure 21:
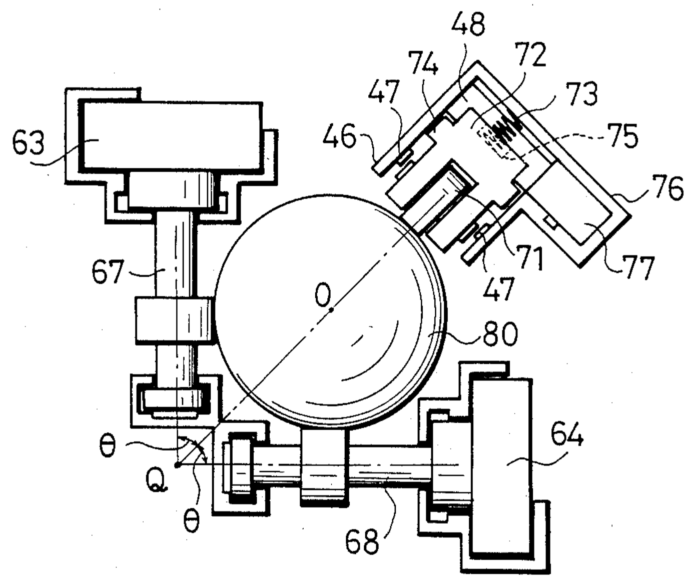

In case that the input device is used as a "MOUSE" type, the lock member 77 is moved into the extension 76 to allow the roller support member 72 to withdraw so that the ball 80 can take its lower position shown by a solid line in FIG. 20. FIG. 21 shows this relationship. More specifically, the ball 80 is compressed to the peripheral surfaces of the first and second follower rollers 67–68 by the compression roller 71. The axes of the first and second follower rollers 67–68 intersect so that they contact the ball 80 from directions perpendicular to each other. When the ball 80 takes its lower position, the compression roller 71 is located on a line connecting the intersection Q of the axes of the first and second follower rollers 67–68 and the center 0 of the ball 80, and compresses the ball 80 equally to the first and second follower rollers 67–68 with the energy of the coil spring 73. The follower rollers 67–68 coaxially supports the first and second encoders 63–64 at their opposite ends. The first and second encoders 63–64 detect rotations of the first and second follower rollers 67–68, respectively, to detect the rotation of the ball 80, dividing it into X- and Y-directional components.

When a user moves the input device on a desk or others, the ball 80 slightly projecting below the aperture 81 of the cover member 82 rotates in a corresponding direction, and the rotation of the ball 80, i.e. the moving amount of the input device is measured in X- and Y-directional components. The user can selectively push the switch arms 59–60 aligned with the side walls of the upper case 4 by a finger of his hand holding the input device to activate the push switches 55 through 58 for a desired signal processing. As described before, the operating lever 11 and the switch arm 59 have a uniform function, and the operating lever 12 and the switch arm 60 have another uniform function. Therefore, the user may select more convenient switching operation, i.e. vertical compression on the operating lever 11 or 12 or horizontal compression on the switch arm 59 or 60 to instruct a desired signal processing. When the input device is used as a "MOUSE" type, a user normally puts some of fingers on the side walls of the input device to hold it. Therefore, his other fingers available for switching operation will touch the operating levers 11 and 12 more readily than the switch arms 59–60. In a "MOUSE" type input device, it is desirable to use the cover on the upper rotary member 30 to protect the interior of the input device against dust which will otherwise enter through a gap produced between the ball 80 and the aperture 33 of the upper rotary member 30 when the ball takes its lower position.

In case that the input device is used as a "TRACKBALL" type, the input device is upset, with the lower case 5 and the lower rotary member 31 facing upward, and the ball 80 being moved to the aperture 33 of the upper rotary member 30 due to its own weight or by user's manual compression. As the result, the compression roller 71 (which contacts the ball 80 at a point where a horizontal cross-section of the ball including the contact point involves the center of the ball 80 and has the maximum diameter in the "MOUSE" type input device) contacts the ball at a point where a horizontal cross-section of the ball including the contact point does not involve the center of the ball and hence has a smaller diameter. Therefore, the roller support member 72 is pushed forwardly (nearer to the ball 80) by the coil spring 73 to a position where the projections 74 engage the stoppers 47 of the housing 46. When the lock member 77 exposed through the window 48 of the lower rotary member 31 is subsequently moved slidably along the window 48 to a position behind the roller support member 72, letting the coil spring 73 loosely enter in the recess 78 thereof, the lock member contacts the rear end of the roller support member 72.

Figure 22:
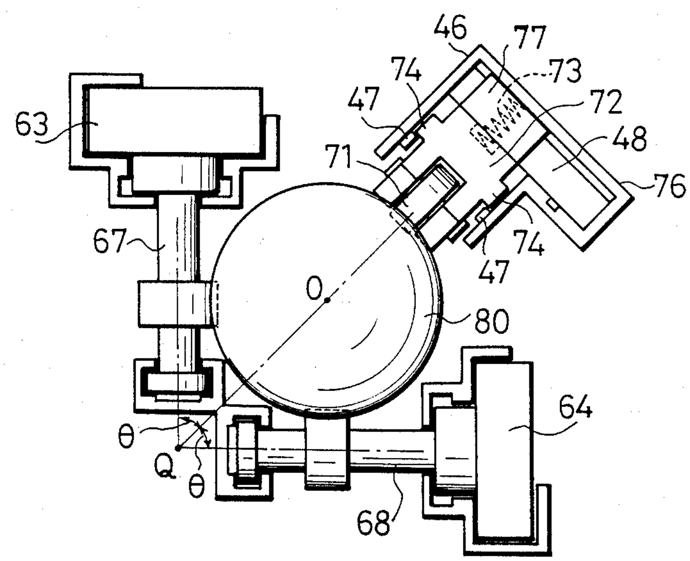
Figure 24:
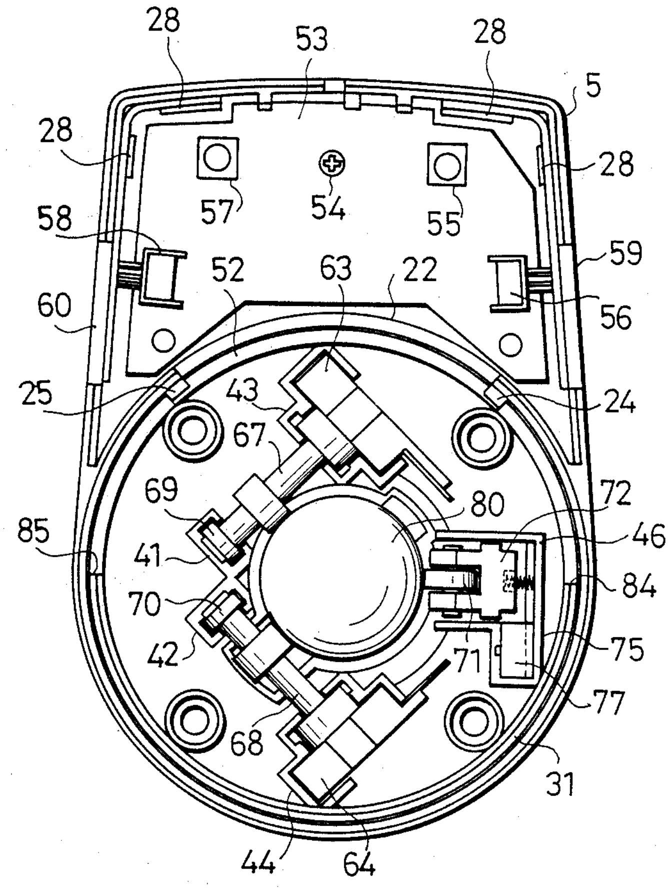

After this, when the input device is inverted into its original orientation where the upper case 4 and upper rotary member 30 face upwardly, the ball 80 partly projects from the aperture 33 of the upper rotary member 30 as shown by a dotted line in FIG. 20. FIG. 22 shows this operative principle. As shown, the roller support member 72 is rearwardly immoved by the lock member 77, and the ball 80 is supported in three directions passing the center of the ball 80 by the compression roller 71 supported by the roller support member 72 and both follower rollers 67–68.

Therefore, when the input device with its cover member removed is moved on a desk or other base member by rotating the ball 80 by a finger touching an exposed portion thereof through the aperture 33 of the upper rotary member 30, the movement of the input device, i.e. the rotation of the ball 80 is detected by the concurrently rotating follower rollers 67–68 and encoders 63–64 in divided X- and Y-directional components. In this case, the ball's own weight and the rotation of the ball produce a radially outward force to the compression roller 71. However, the lock member 77 prohibits any rearward movement of the roller support member 72 so that the compression roller 71 never fails to maintain the ball 80 at a level above and spaced from the surface of the desk or other member on which the input device is put.

Also in the "TRACKBALL" type input device, the operating levers 11–12 and switch arms 59–60 are manually pushed to instruct a desired signal processing. However, a user of the input device of this type normally uses one of his hands to support the input device and effect switching operations and uses the other hand to rotate the ball. Therefore, the switch arms 59–60 for lateral compression will be more convenient than the operating levers 11–12 for vertical compression.

Particularly in the "MOUSE" type input device which is grasped by a user's hand and moved on a desk, it often occurs that the X-Y directions intended by the user differ from the X-Y directions of the input device itself according to the user's gripping angle on to the outer shell of the input device. To avoid this, the embodiment is configured to change the coordinate axe of the input device by changing the positional relationship between the outer casing 1 defining the outer margin of the input device and the inner casing 2 including the rotation detecting means.

More specifically, as shown in FIG. 18, when the first stopper 24 of the lower case 5 engages one end 84 of the cutout 52 of the lower rotary member 31, the axis of the first follower roller 67 is aligned with the length direction of the outer casing 1 whereas the axis of the second follower roller 68 intersects with the length direction of the outer casing 1. Therefore, the Y-axis of the coordinate system in the user's recognition is aligned with the length direction of the input device as shown at a solid line in FIG. 23. When the inner casing 2 is rotated clockwise in FIG. 18 by 4–5 degrees with respect to the first casing 1, the end portion 84 of the cutout 52 of the lower rotary member 31 moves away from the first stopper 24 of the lower case 5, and the other end portion 85 of the cutout 52 approaches the second stopper 25, so that the axes of the first and second follower rollers 67–68 mounted on the lower case 5 are angled by about 45 degrees with respect to the length direction of the outer casing 1. Thus, the length direction of the input device is angled by about 45 degrees with respect to the X and Y axes of the coordinate system in the user's recognition.

The upper rotary member 30 and cover 3 may be provided with indication marks 86–87 to permit a user to visually acknowledge the relative rotation of the outer and inner casings 1–2 upon selection of his most convenient gripping angle. Also, the click spring 79 mounted in the recess 51 of the lower rotary member 31 engageably moves along the click notches 23 provided along the inner peripheral wall of the lower case 5 during selection of the best gripping angle to impart a tactile feedback to the user.

The maximum relative rotation of the outer and inner casings 1–2 may be selected as desired by engaging positions of the first and second stoppers 24–25 of the outer casing 1 with both end portions 84–85 of the cutout 52 of the inner casing 2. In the illustrated embodiment, the stoppers 24–25 provided at about 90 degrees interval on the peripheral surface of the lower case 5 cooperate with the vertically offset portion 52 extending over about a half cycle of the aperture 40 of the lower rotary member 31 to provide the maximum relative rotation of about 90 degrees. Therefore, during the relative rotation of the casings 1–2, the lead wires 65–66 (or flexible plates) connecting the encoders 63–64 to the circuit board 53 are always located between the stoppers 24–25 and are never destructively stretched.

The coordinate axes of the input device can be selectively changed by other arrangements rather than the illustrated relative rotation of the two casings 1–2, provided that the axes of the first and second follower rollers 67–68 can be changed with respect to the casing carrying switch activating members. For example, the follower rollers 67–68 may be mounted on a support plate which is located inside the casing but rotated by an external manual operation.

The illustrated embodiment is selectively operative as both, i.e. "MOUSE" and "TRACKBALL" types. However, the invention may be used in an input device operative as a single type, i.e. "MOUSE" type or "TRACKBALL" type.

Summarizing the invention, the coordinate axes selective arrangement provides a great convenience in use of the input device, by permitting any user to readily coincide his intended coordinate axes with the coordinate axes of the input device. The illustrated embodiment for the coordinate axes selective arrangement where the outer and inner casings are relatively rotatable never causes destructive forces to the lead wires extending from the rotation detecting means such as follower rollers mounted in the inner casing, because the maximum relative rotation is limited within an angle by stoppers. Further, the input device has a double switch activating arrangement to permit any user to select his more convenient switch activating members for vertical compression or lateral compression upon instructing a desired signal processing. Other various advantages of the invention will be apparent to any artisan from the description in the text.

The embodiments of the invention in which an exclusive property or privilege is claimed are defined as follows.

1. An X-Y direction input device comprising:

a rotatably mounted ball;

a first follower roller contacting and rotated by said ball on a first rotational axis;

a second follower roller contacting and rotated by said ball on a second rotational axis perpendicular to the first rotational axis of said first follower roller, wherein the rotation of said first and second follower rollers by said ball on said first and second rotational axes defines an input X-Y plane;

a first rotation detecting means detecting the rotation of said first follower roller;

a second rotation detecting means detecting the rotation of said second follower roller;

a switch board carrying a push switch assembly for processing signals from said first and second rotation detecting means;

a switch activating means for activating said push switch assembly; and an inner shell means enveloping at least said ball, first and second follower rollers and first and second rotation detecting means, and an outer shell means enveloping at least said switch board and having an external orientation axis in said X-Y plane, said switch activating means being exposed on outer surfaces of said outer shell means, and said inner shell means being rotatably engaged with said outer shell means for rotation relative thereto about an axis perpendicular to said X-Y plane, whereby said first and second axes of said first and second follower rollers can be rotatively changed when desired relative to said external orientation axis of said outer shell means.

2. An X-Y direction input device of claim 1 wherein said outer shell means includes a first casing having a circular aperture and said inner shell means includes a second casing rotatably engaging said aperture, said first and second casings being provided with stoppers to limit their relative rotation.

3. An X-Y direction input device of claim 1 wherein said switch activating means includes a first switch activating assembly exposed on the upper surface of said outer shell means and a second switch activating assembly exposed on the side surfaces of said outer shell means, said first and second switch activating assemblies having a uniform function.

4. An X-Y direction input device of claim 3 wherein said push switch assembly includes first push switches having their operative surfaces opposed in a first direction and activated by said first switch activating assembly, and second push switches having their operative surfaces opposed in a second direction which is perpendicular to said first direction and activated by said second switch activating assembly.

* * * * *